United States Patent [19]

Glembin et al.

[11] Patent Number: 4,510,334

[45] Date of Patent: Apr. 9, 1985

[54] METHOD OF PREPARING ALKALIHALIDE FREE OLIGOMERIC, BROMINOUS XYLYLENE BISPHENOL ETHERS

[75] Inventors: Dirk Glembin, St. Augustin; Kurt Huhn, Lohmar; Günter Meyer, Troisdorf-Sieglar; Manfred Thallmeier, Troisdorf-Eschmar, all of Fed. Rep. of Germany

[73] Assignee: Dynamit Nobel Aktiengesellschaft, Cologne, Fed. Rep. of Germany

[21] Appl. No.: 485,343

[22] Filed: Apr. 15, 1983

[30] Foreign Application Priority Data

Apr. 17, 1982 [DE] Fed. Rep. of Germany ....... 3214199

[51] Int. Cl.$^3$ .................... C07C 41/36; C07C 41/16; C07C 43/275; C08G 65/30
[52] U.S. Cl. .................................. 568/643; 568/33; 568/641
[58] Field of Search .......................... 568/33, 641, 643

[56] References Cited

U.S. PATENT DOCUMENTS 4,371,709 2/1983 Steffen et al. ........................ 568/33

Primary Examiner—Bernard Helfin
Attorney, Agent, or Firm—Felfe & Lynch

[57] ABSTRACT

In a method for the removal of alkali halides by washing them out of reaction products prepared, in the presence of ketones which form a miscibility gap with water, by a reaction of xylylene dichlorides and/or bromides with bisphenols in the presence of alkaline compounds or in the form of alkali salts, at 85° to 160° C., with the addition in some cases of terminal-group-closing monophenols or monohalogen alkyl compounds, water or a water-ketone mixture solvent is added to the reaction mixture before beginning the filtration, and afterward is recycled. For the complete recovery of the ketones and alkali halides and the reuse of the ketones with reduced energy consumption a kentonous phase and an aqueous phase are recovered by separate evaporation after the separation of the filtrate in two liquid phases, both of the condensates are combined to a ketone-water mixture, the filter cake is stirred up again in the ketone-water mixture and filtered a second time.

4 Claims, No Drawings

METHOD OF PREPARING ALKALIHALIDE FREE OLIGOMERIC, BROMINOUS XYLYLENE BISPHENOL ETHERS

BACKGROUND OF THE INVENTION

The invention relates to a method of removing alkali halides in a washing step from the reaction products of xylylene dichlorides and/or xylylene dibromides with bisphenols in the presence of alkaline compounds or alkali salts, at 85° to 160° C. and, in some cases, under addition of end-group blocking monophenols or monohalogen alkyl compounds, in the presence of ketones exhibiting a miscibility gap with water, followed by the addition of water or a mixture of ketones and water to the reaction mixture and then filtration thereof with recycling of the filtrates.

The reaction as above, for the production of oligomeric, brominous xylylene bisphenol ethers, is performed advantageously in the presence of ketones as solvents. Corresponding amounts of alkali halides occur as byproducts (cf. DE-OS No. 2,929,914 corresponding to copending application U.S. Pat. No. 06/167,555 of 07/11/80) and now U.S. Pat. No. 4,371,709.

The process is especially suitable for the oligomeric brominous xylylene glycol bisphenol ethers which bear as terminal groups aryloxy moieties formed from phenols, especially brominated aryloxy moieties. These ethers have the formula:

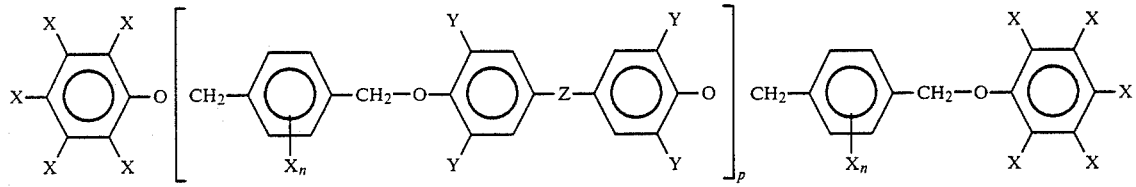

wherein p amounts to 2 to 10 and each X is Br, Cl or H, n=0 to 4 and each Y is Br, Cl or H, at least two Br being contained in the sum of X+Y, and Z is a direct bond, —CH$_2$—, —C(CH$_3$)$_2$— or —SO$_2$—. The ethers are useful as fire-retardants in plastics.

Phenols forming suitable terminal groups are especially tribromophenol, in some cases also pentabromophenol and the corresponding chlorophenols.

The bromine content of these ethers is to be not less than 40 weight percent, bromine contents above 60 weight percent being preferred.

The preparation of the oligomeric, brominous xylylene bisphenol ethers is accomplished in a conventional manner by dissolving the halogenated bisphenol with a stoichiometric to slightly less than stoichiometric amount of alkali hydroxide (as aqueous solution) in the ketone solvent, bringing the solution to reaction in the autoclave for 1 to 4 hours with a more than stoichiometric amount of halogen xylylene dihalide, then adding the necessary amount of a halogen monophenol alkali salt to close the terminal group, and letting the reaction complete itself for another 1 to 4 hours.

To obtain a pure end product, the alkali halides must be removed as completely as possible from the reaction product. This is accomplished by washing and filtration, resulting in large amounts of waste waters when the known process is followed. The ketones used as solvents and the alkali halides that are formed end up in some washing filtrate fractions in such low concentrations that the complete recovery and recycling of these substances is difficult and costly. However they occur in high enough concentrations so that they must be removed to avoid environmental pollution. Removal is therefore accomplished inspite of the costs.

The problem for operation on an industrial scale, was to find a method in which practically complete recovery of the ketones and alkali halides is accomplished and the reuse of the ketones made possible, within reasonable energy consumption restraints.

The invention provides an effective method of avoiding prior art difficulties by requiring that a ketonous and an aqueous phase after separation of the filtrate into two liquid phases are recovered by separate evaporation of the two phases, both of the condensates are combined to a mixture, the ketone-water mixture is reused as washing media in the washing process, the filter cake, formed in a process of the kind described above, is stirred in the recycled ketone-water mixture, and is filtered a second time.

It is economically advantageous to process the phases which form when the filtrate fractions after allowing to separate into one phase which is predominantly aqueous and one which is predominantly ketonous by separate evaporation and to reuse both of the condensates in the washing process as washing media; the condensate of the ketonous phase being further usable in the reaction as a solvent.

In the proposed process normally about 20% or less of the amount of water required by the prior method is required for washing out the alkali halide.

Furthermore, because there is relatively high concentration of alkali halide in the filtrate, the mixture separates still more easily into a less aqueous ketone phase and into a less ketonous aqueous phase than has been observed in the examples of DE-OS No. 2,929,914.

It has been found that the simple evaporation of the ketonous filtrate phase results in a ketone condensate having low water content and which can be reused entirely or at least in part as solvent in the reaction and/or as a washing medium in the washing process. The complete separation of the ketone and water, which is very difficult to accomplish, is not necessary for this reuse. The aqueous filtrate phase is separated by simple evaporation into a ketonous water condensate which can be reused as a washing medium in the washing process and in the crystaline alkali halogenide. Suitable ketones are the aliphatic and cyclic ketones of 3 to 10 carbon atoms. Examples of such ketones are: acetone, methyl ethyl ketone, methyl isopropyl-, methyl isobutyl-,methyl tert.-butyl-,diisobutyl-,and di-tert.-butyl-ketone, 2-pentanone, 3-pentanone, 2-hexanone, 3-hexanone, heptanone, cycloheptanone, cyclohexanone, acetophenone, isophorone, but preferably 2-butanone, methyl isobutyl ketone or cyclohexanone, of which 2-butanone is greatly preferred.

After the reaction there will remain, for example, a reaction mixture containing 84 wt.-% of polytetrabromo-p-xylylene-3,3',5,5'-tetrabromodianether (hereinafter called TBX-TBD), including byproducts, and 16 wt.-% of NaBr, in a mixture of methyl ethyl ketone and water.

The prior art method of processing the reaction mixture at this point was to add water, the amount of water in the reaction mixture being increased to such an extent that the sodium bromide could go completely into solution. The reaction mixture is then filtered in a paring-type centrifugal separator and washed. To assure that the residual sodium bromide concentration will be less than 0.4% by weight in the dried end product, the washing must be performed with a total of 4.5 to 5 kg of water per kg of TBX-TBD.

After the filtration, a methylethyl ketone and water mixture remains, which separates into a methyl ethyl ketone phase and an aqueous phase. Because of the high concentration of the methyl ethyl ketone, the methyl ethyl ketone can be recovered from the methyl ethyl ketone phase for reuse. The high sodium bromide concentration also permits its recovery from the aqueous phase.

After the washing there remains a wash water containing 1.5 wt.-% of sodium bromide and about 0.5 wt.-% of methyl ethyl ketone. These amounts of sodium bromide and methyl ethyl ketone, absolutely considered, are still relatively great although economical recovery is not possible on account of their low concentration. However, it is necessary, in order to avoid pollution of the environment from discharged waste water, to remove the ketone and halide from the waste water.

The process of the invention, on the other hand, is performed in the following manner:

After the reaction, the reaction mixture is mixed with condensate from the aqueous phase of the filtrate from a previous working up. The filtration is then performed with the aid of pressure in a filter equipped with a stirring mechanism. Within the filter cake that forms, the liquid separates into a heavier aqueous phase in which the alkali halides are present in dissolved form, and a lighter phase that is virtually free of alkali halide. The aqueous phase is the first phase to leave the filter. The ketonous phase, which follows next, displaces by diffusion a portion of the aqueous phase still containing alkali halide, which remains adhered to the solid. This displaced aqueous phase leaves the filter together with the ketone phase as the filtrate. Since the upper portion of the filter cake is in contact with the aqueous phase for only a short time and the bottom portion is in contact for a considerably longer time, the alkali halide concentration gradient decreases from the top to the bottom of this filter cake after this filtration.

This first filtration step is followed by washing with a mixture of the condensates from the ketonous and aqueous phases of earlier product working up. The amount of liquid used should be sufficient to allow the filter cake to be stirred up and again by the stirring mechanism.

The stirring accomplishes both intensive exchange between the liquid adhering to the solid and the washing medium, and a physical shifting about of the solid such that the alkali halide concentration is evened out in the filter cake.

After the stirring, the second filtration step is performed in the same manner as described above. After this filtration there remains a moist solid with no more than a very low alkali halide concentration which is tolerable in practice, and with a residual moisture consisting primarily of ketone with a small amount of water.

The filtrates are collected in containers and allowed to separate into an aqueous phase and a ketonous phase. Because of the relatively high alkali halide concentration, a ketonous phase containing less water and an aqueous phase containing less ketone are obtained as compared to mixtures free of alkali halide.

The ketonous phase is evaporated in a suitable apparatus to form a condensate containing relatively little water. It remains a small amount disposable residue. The condensate with relatively low water content is reused as a solvent for the reaction and as a washing medium as described above.

The aqueous phase is also evaporated in a suitable apparatus. The condensate, which due to its ketone content cannot be discarded as untreated sewage, is also reused, as a washing medium, as described above.

EXAMPLE

The starting mixture is a reaction mixture containing 84% of polytetrabromo-p-xylylene-3,3',5,5'-tetrabromodianether (hereinafter called TBX-TBD) including byproducts and 16% of sodium bromide, by weight, in a mixture of methyl ethyl ketone and water.

By the addition of recovered aqueous condensate containing methyl ethyl ketone (about 1.2 kg of $H_2O$ per kg of NaBr), the water content in the reaction mixture is increased to the extent that the sodium bromide can be completely dissolved. The reaction mixture thus diluted is filtered in a single-layer filter equipped with a stirrer that can be raised and lowered, at 4 bar of nitrogen pressure. The mesh size of the filter is 0.02 mm. The filter is loaded such that a filter cake depth of 12 cm is produced. The filtration is ended when a residual moisture content of about 35% is reached in the filter cake. To prevent nitrogen from breaking through during the filtration, the stirrer is raised to the uppermost position to smooth the surface of the filter cake. After the filtration has ended, recovered aqueous condensate containing methyl ethyl ketone, and recovered methyl ethyl ketone condensate containing water, are combined to a mixture of about 50% of methyl ethyl ketone by weight and used for the washing (0.7 to 0.8 kg of mixture per kilogram of TBX-TBD).

With the stirrer, which is then lowered to the bottom position, the filter cake is stirred up in this mixture. Then another filtrate is performed under 4 bar of nitrogen pressure. The filtration is ended when a residual moisture of about 30% is reached. Again the stirrer is raised to the upper position to prevent nitrogen from breaking through during the filtration by smoothing the surface of the filter cake.

After drying, a residual sodium bromide concentration of less than 0.2% by weight is found. The first filtrate contains about 35% of sodium bromide, by weight, in the aqueous phase, and the washing filtrate contains about 7% of sodium bromide in the aqueous phase.

Further experiments have shown that, with different washing medium concentrations, e.g. 12% of methyl ethyl ketone and 88% of water, by weight, and different filter cake depths, e.g. 30 cm, similarly good washing results are achieved. The determination in each case of the optimum concentrations and filtration conditions can easily be made by the person skilled in the art.

It will be understood that the specification and examples are illustrative but not limitative of the present invention and that other embodiments within the spirit and scope of the invention will suggest themselves to those skilled in the art.

What is claimed is:

1. A method of removing alkali halides in a washing step from a reaction mixture of the reaction products of xylylene dichlorides and/or xylylene dibromides with bisphenols in the presence of alkaline compounds or alkali salts, at 85° to 160° C. and, in some cases, under addition of end-group blocking monophenols or monohalogen alkyl compounds, in the presence of ketones exhibiting a miscibility gap with water, comprising adding a ketone-water mixture to the reaction mixture wherein the ketone is of 3 to 10 carbon atoms, subjecting the reaction mixture to filtration to obtain a filtrate; separating the filtrate into a ketonous phase and an aqueous phase and separately evaporating and condensing each of the separated phases to form first and second condensates, combining the condensates to form the ketone-water mixture, using said ketone water mixture as washing media in the washing step, stirring the filter cake in the ketone water mixture and again filtering the resultant mixture.

2. The method of claim 1, wherein the ketone is an aliphatic ketone.

3. The method of claim 1, wherein the ketone is a cyclic ketone.

4. The method of claim 1, wherein the ketone is selected from the group comprising acetone, methyl ethyl ketone, methyl isopropyl-, methyl isobutyl-, methyl tert.-butyl-, diisobutyl-, and di-tert.-butyl-ketone, 2-pentanone, 3-pentanone, 2-hexamone, 3-hexanone, heptanone, cycloheptanone, cyclohexanone, acetophenone, isophorone, preferably 2-butanone, methyl isobutyl ketone or cyclohexanone.

* * * * *